(12) United States Patent
Zhao et al.

(10) Patent No.: US 12,399,534 B2
(45) Date of Patent: Aug. 26, 2025

(54) FOLDING MECHANISM AND ELECTRONIC DEVICE

(71) Applicant: VIVO MOBILE COMMUNICATION CO., LTD., Dongguan (CN)

(72) Inventors: Dongqin Zhao, Dongguan (CN); Dongcun Cheng, Dongguan (CN); Zhengjun Luo, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 206 days.

(21) Appl. No.: 18/369,133

(22) Filed: Sep. 15, 2023

(65) Prior Publication Data
US 2024/0004430 A1 Jan. 4, 2024

Related U.S. Application Data

(63) Continuation of application No. PCT/CN2022/080909, filed on Mar. 15, 2022.

(30) Foreign Application Priority Data

Mar. 19, 2021 (CN) .......................... 202110297137.8

(51) Int. Cl.
*G06F 1/16* (2006.01)
*F16C 11/04* (2006.01)

(52) U.S. Cl.
CPC ............ *G06F 1/1652* (2013.01); *F16C 11/04* (2013.01); *G06F 1/1681* (2013.01)

(58) Field of Classification Search
CPC .... G06F 1/1652; G06F 1/1681; G06F 1/1616; G06F 1/1641; G06F 1/16; G06F 1/1613;
(Continued)

(56) References Cited

U.S. PATENT DOCUMENTS 10,664,021 B1 5/2020 Hsu et al.
11,048,296 B2 * 6/2021 Hsu .................. G06F 1/1652
(Continued)

FOREIGN PATENT DOCUMENTS

CN 205750631 U 11/2016
CN 209375705 U 9/2019
(Continued)

OTHER PUBLICATIONS

International Search Report issued in corresponding International Application No. PCT/CN2022/080909, mailed May 27, 2022, 4 pages.
(Continued)

*Primary Examiner* — Abhishek M Rathod
(74) *Attorney, Agent, or Firm* — IPX PLLC

(57) ABSTRACT

This application discloses a folding mechanism and an electronic device. The folding mechanism includes a base, a first housing seat, a second housing seat, a first screen supporting plate, a second screen supporting plate, and a hinge mechanism. The first housing seat and the second housing seat are both rotatably connected to the base by means of the hinge mechanism, the first housing seat is rotatably arranged on the first screen supporting plate, and the second housing seat is rotatably arranged on the second screen supporting plate. First rotating portions and second rotating portions, distributed in an extension direction of the base, are respectively arranged at first ends of a first swing arm and a second swing arm.

16 Claims, 4 Drawing Sheets

(58) Field of Classification Search
CPC ...... G06F 1/1624; G06F 1/1679; G06F 1/181; H05K 5/0226; H05K 5/0017; H05K 5/0217; F16C 11/04
See application file for complete search history.

(56) References Cited

U.S. PATENT DOCUMENTS

| | | | |
|---|---|---|---|
| 11,605,796 B2* | 3/2023 | Kim | G06F 1/1652 |
| 11,696,415 B2* | 7/2023 | Xie | G06F 1/1616 |
| | | | 361/807 |
| 2020/0103935 A1 | 4/2020 | Hsu | |

FOREIGN PATENT DOCUMENTS

| | | |
|---|---|---|
| CN | 110784570 A | 2/2020 |
| CN | 111614806 A | 9/2020 |
| CN | 111698355 A | 9/2020 |
| CN | 112333308 A | 2/2021 |
| CN | 113067923 A | 7/2021 |
| WO | 2020186890 A1 | 9/2020 |

OTHER PUBLICATIONS

First Office Action issued in related Chinese Application No. 202110297137.8, mailed Dec. 2, 2022, 5 pages.
Second Office Action issued in related Chinese Application No. 202110297137.8, mailed Jul. 28, 2023, 8 pages.
Extended European Search Report issued in related European Application No. 22770495.4, mailed Aug. 1, 2024, 10 pages.

* cited by examiner

FOLDING MECHANISM AND ELECTRONIC DEVICE

CROSS-REFERENCE TO RELATED APPLICATIONS

This application is a continuation of International Application No. PCT/CN2022/080909, filed Mar. 15, 2022, which claims priority to Chinese Patent Application No. 202110297137.8, filed Mar. 19, 2021. The entire contents of each of the above-referenced applications are expressly incorporated herein by reference.

TECHNICAL FIELD

This application relates to the technical field of communication devices, and in particular to a folding mechanism and an electronic device.

BACKGROUND

With the development of technology, the development of electronic devices becomes more and more rapid, and meanwhile, users' requirements for electronic devices become higher and higher. At present, flexible displays are also widely used in electronic devices, so that folding electronic devices are emerged.

However, in the folding process, the bending areas of the flexible displays are easy to squeeze, and then excessive bending occurs, which will eventually affect the service life of the flexible displays.

SUMMARY

Embodiments of this application aim to provide a folding mechanism and an electronic device.

In a first aspect, an embodiment of this application discloses a folding mechanism, including a base, a first housing seat, a second housing seat, a first screen supporting plate and a second screen supporting plate, where the first housing seat is arranged on the first screen supporting plate, and the first screen supporting plate is in rotation fit with the first housing seat;

the second housing seat is arranged on the second screen supporting plate, and the second screen supporting plate is in rotation fit with the second housing seat;

the folding mechanism further includes a hinge mechanism, where the hinge mechanism includes a first swing arm, a second swing arm, a third swing arm and a fourth swing arm, the first swing arm and the third swing arm are both arranged on a same side as the first housing seat, and the second swing arm and the fourth swing arm are both arranged on a same side as the second housing seat;

first rotating portions and second rotating portions, distributed in an extension direction of the base, are respectively arranged at first ends of the first swing arms and second swing arms, third rotating portions and fourth rotating portions are respectively arranged on two opposite sides of the base, the first rotating portions are in rotation fit with the third rotating portions, the second rotating portions are in rotation fit with the fourth rotating portions, and the first swing arm and the second swing arm are both limited to the base in a direction perpendicular to the extension direction of the base;

a second end of the first swing arm is rotatably connected to the first housing seat, a first end of the third swing arm is rotatably connected to the base, a second end of the third swing arm is in sliding fit with the first housing seat, the second end of the third swing arm is configured to slide relative to and be in rotation fit with the first screen supporting plate, and a rotating axis of the first end of the first swing arm and a rotating axis of the first end of the third swing arm are distributed at an interval; and a second end of the second swing arm is rotatably connected to the second housing seat, a first end of the fourth swing arm is rotatably connected to the base, a second end of the fourth swing arm is in sliding fit with the second housing seat, the second end of the fourth swing arm is configured to slide relative to and be in rotation fit with the second screen supporting plate, and a rotating axis of the first end of the second swing arm and a rotating axis of the first end of the fourth swing arm are distributed at an interval.

In a second aspect, an embodiment of this application discloses an electronic device, including the folding mechanism according to the first aspect, a flexible display, a first housing and a second housing, where the first housing is fixedly connected to the first housing seat, the second housing is fixedly connected to the second housing seat, the first screen supporting plate is arranged between the first housing and the base, the second screen supporting plate is arranged between the second housing and the base, and the flexible display is arranged on the base, the first housing, the second housing, the first screen supporting plate and the second screen supporting plate.

The folding electronic device according to this embodiment of this application is folded inwards, that is, after the folding electronic device is folded, the flexible display is superimposed between the first folding portion and the second folding portion. In the folding process of the folding electronic device, the rotating axis of the first end of the first swing arm and the rotating axis of the first end of the third swing arm are distributed at an interval, and the rotating axis of the first end of the second swing arm and the rotating axis of the first end of the fourth swing arm are distributed at an interval. Therefore, when a user controls the first folding portion to rotate relative to the second folding portion, the first housing seat and the second housing seat oppositely rotate relative to the base, the second end of the first swing arm and the second end of the third swing arm relatively rotate, and the second end of the second swing arm relatively rotates relative to the second end of the fourth swing arm. Finally, the second end of the third swing arm drives the first screen supporting plate to rotate relative to the first housing seat, and the second end of the fourth swing arm drives the second screen supporting plate to rotate relative to the second housing seat. In this case, an end of the first screen supporting plate close to the base and an end of the second screen supporting plate close to the base are far away from each other, and finally, an accommodation space gradually expanded in a direction close to the base can be formed, so that an enough space is provided for the bending area of the flexible display in the folding state, and the bending area of the flexible display is prevented from being excessively squeezed and thus damaged.

In this process, the second end of the third swing arm slides relative to the first housing seat, which can adapt to the rotation of the first housing seat driven by the second end of the first swing arm and prevent the rotation of the first housing seat from being locked. Similarly, the second end of the fourth swing arm slides relative to the second housing seat, which can adapt to the rotation of the second housing seat driven by the second end of the second swing arm and prevent the rotation of the second housing seat from being locked.

Meanwhile, the first housing seat is rotatably connected to the first swing arm, and the second housing seat is rotatably connected to the second swing arm. Therefore, when the user controls the folding electronic device to fold, the first housing seat can rotate relative to the first swing arm, and the second housing seat can rotate relative to the second swing arm, so that the first housing connected to the first housing seat and the second housing connected to the second housing seat can further rotate to close and parallel positions, thereby preventing a tapered gap from being generated between the first folding portion and the second folding portion after the folding electronic device is folded, and thus preventing foreign matter from entering.

In addition, the first rotating portions and the second rotating portions are respectively arranged between the first swing arm and the second swing arm, and the third rotating portions and the fourth rotating portions are correspondingly arranged on the two opposite sides of the base. The first rotating portions cooperate with the third rotating portions, and the second rotating portions cooperate with the fourth rotating portions, so that the first housing seat and the second housing seat are limited to the base in the direction perpendicular to the extension direction of the base while the first housing seat and the second housing seat are rotatably connected by means of the base, thereby reducing the connecting difficulty between the first housing seat and the second housing seat.

BRIEF DESCRIPTION OF DRAWINGS

The accompanying drawings described herein are used to provide a further understanding of this application, and form part of this application. Exemplary embodiments of this application and descriptions thereof are used to explain this application, and do not constitute any inappropriate limitation to this application. In the accompanying drawings.

DETAILED DESCRIPTION

Figure 1:
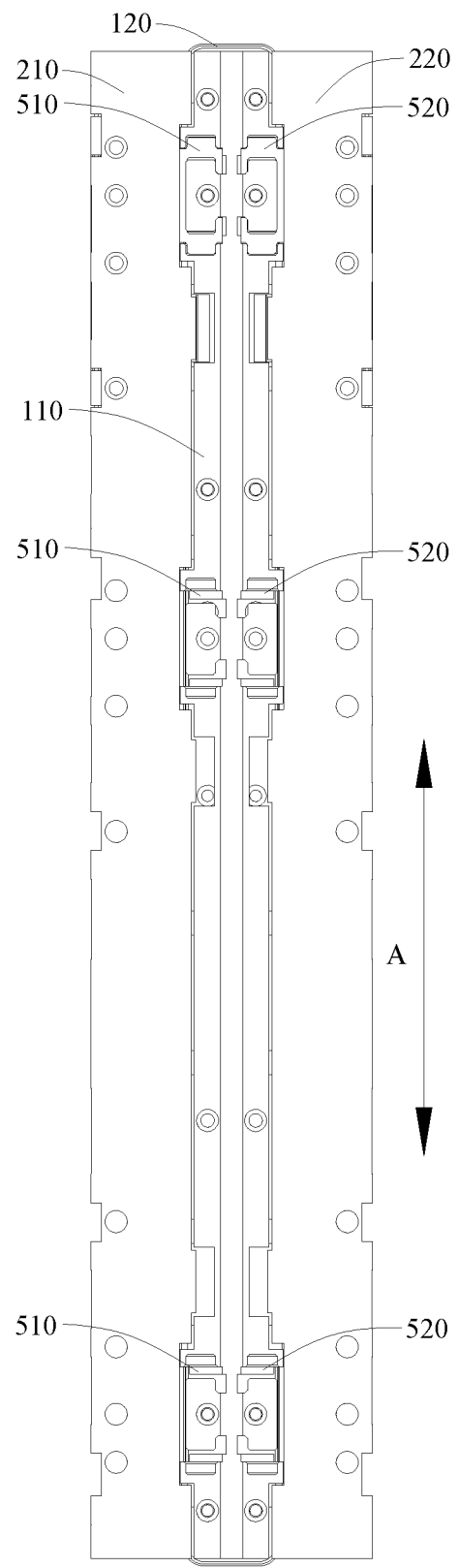
FIG. 1 is a schematic structural diagram of a folding mechanism disclosed by an embodiment of this application.

The technical solutions in embodiments of this application are described in the following with reference to the accompanying drawings in the embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

Terms "first" and "second" in the specification and claims of this application are used to distinguish similar objects, but are unnecessarily used to describe a specific sequence or order. It should be understood that data used in this way is exchangeable in a proper case, so that the embodiments of this application can be implemented in an order different from the order shown or described herein. Moreover, the objects distinguished by the terms "first" and "second" are usually of the same category, and the number of the objects is not limited, for example, the first object can be one or more. In addition, "and/or" used in the specification and claims represents at least one of the connected objects, and the character "/" generally indicates that the associated objects are in an "or" relationship.

The folding mechanism and electronic device provided by the embodiments of this application will be described in detail below with reference to the drawings through specific embodiments and application scenarios thereof.

As shown in FIG. 1 to FIG. 6, an embodiment of this application discloses a folding mechanism. The disclosed folding mechanism can be applied to a folding electronic device, so that the folding and unfolding of the folding electronic device are achieved.

The folding mechanism disclosed by this embodiment of this application includes a base 110, a first housing seat 310, a second housing seat 320, a first screen supporting plate 210, a second screen supporting plate 220 and a hinge mechanism.

The base 110 is a fundamental component of the folding mechanism. The base 110 can provide a mounting base for other components of the folding mechanism, so that the other components of the folding mechanism are directly or indirectly mounted on the basis of the base 110. In some embodiments, the base 110 is a sheet so as to reduce the occupied space. In some embodiments, the base 110 can be a metal sheet. The metal sheet can make the base 110 still have enough strength at a small thickness, so that the support performance of the base 110 is not affected.

The folding electronic device according to this embodiment of this application includes a first folding portion, a second folding portion and a flexible display.

In the case that the folding mechanism is in a folding state, the folding electronic device is also in the folding state, so that the folding electronic device is in a portable state. At the moment, the first folding portion is superimposed with the second folding portion, and the flexible display is folded through its own deformation.

In the case that the folding mechanism is in a unfolding state, the folding electronic device is also in the unfolding state, and at the moment, the first folding portion and the second folding portion are spread out, so that the flexible display is unfolded through its own deformation, thereby achieving the purpose of a large display area.

The first folding portion is rotatably connected to the second folding portion by means of the folding mechanism, and the first folding portion rotates relative to the second folding portion, so that the folding electronic device is switched between the unfolding state and the folding state. That is to say, the first folding portion and the second folding portion are both connected to the folding mechanism.

The first folding portion includes a first housing, and the second folding portion includes a second housing. The first housing seat 310 is configured to be fixedly connected to the first housing, so that the assembly connection between the folding mechanism and the first housing is achieved, and thus the assembly connection between the folding mechanism and the first folding portion is achieved. In some embodiments, the first housing seat 310 is connected to the first housing by using threaded connectors and fixed clamping, bonding, riveting and other fixing methods. This embodiment of this application does not limit the specific fixing method between the first housing seat 310 and the first housing.

Similarly, the second housing seat 320 is configured to be fixedly connected to the second housing, so that the assembly connection between the folding mechanism and the second housing is achieved, and thus the assembly connection between the folding mechanism and the second folding portion is achieved. In some embodiments, the second housing seat 320 is connected to the second housing by using threaded connectors and fixed clamping, bonding, riveting and other fixing methods. This embodiment of this application does not limit the specific fixing method between the second housing seat 320 and the second housing.

As described above, the folding electronic device includes a flexible display. The first screen supporting plate 210 and the second screen supporting plate 220 are structural members of the folding mechanism for supporting the flexible display. In some embodiments, the base 110 can also support the flexible display. The first screen supporting plate 210 and the second screen supporting plate 220 can cooperate with the first housing and the second housing to support the whole flexible display.

The first housing seat 310 is arranged on the first screen supporting plate 210, and the first screen supporting plate 210 is in rotation fit with the first housing seat 310. In some embodiments, the first housing seat 310 is arranged on a back surface of the first screen supporting plate 210. The back surface of the first screen supporting plate 210 is opposite to a supporting surface of the first screen supporting plate 210. Therefore, the assembly position can avoid the effect of the first housing seat 310 on the supporting function of the first screen supporting plate 210.

The second housing seat 320 is arranged on the second screen supporting plate 220, and the second screen supporting plate 220 is in rotation fit with the second housing seat 320. In some embodiments, the second housing seat 320 is arranged on a back surface of the second screen supporting plate 220. The back surface of the second screen supporting plate 220 is opposite to a supporting surface of the second screen supporting plate 220. Therefore, the assembly position can avoid the effect of the second housing seat 320 on the supporting function of the second screen supporting plate 220.

In this embodiment of this application, the first housing seat 310 and the first screen supporting plate 210 are arranged on a first side of the base 110 so as to correspond to the first folding portion. The second housing seat 320 and the second screen supporting plate 220 are arranged on a second side of the base 110 so as to correspond to the second folding portion. It should be noted that: the first side and the second side are oppositely arranged.

In some embodiments, the first housing seat 310 and the second housing seat 320 can be symmetrically arranged on two sides of the base 110. Similarly, the first screen supporting plate 210 and the second screen supporting plate 220 can also be symmetrically arranged on the two sides of the base 110. The symmetrical arrangement enables the weight of the folding mechanism to be balanced, and avoids a bias phenomenon.

The hinge mechanism disclosed by this embodiment of this application includes a first swing arm 510, a second swing arm 520, a third swing arm 530 and a fourth swing arm 540.

The first swing arm 510 and the third swing arm 530 are both arranged on a same side as the first housing seat 310, i.e., the first swing arm 510, the third swing arm 530 and the first housing seat 310 are all located on the first side of the base 110.

The second swing arm 520 and the fourth swing arm 540 are both arranged on a same side as the second housing seat 320, i.e., the second swing arm 520, the fourth swing arm 540 and the second housing seat 320 are all located on the second side of the base 110.

First rotating portions 501 and second rotating portions 502 are respectively arranged at first ends of the first swing arm 510 and the second swing arm 520, the first rotating portions 501 and the second rotating portions 502 are distributed in an extension direction of the base 110, and correspondingly, third rotating portions 111 and fourth rotating portions 112 are respectively arranged on two opposite sides of the base 110. In some embodiments, the extension direction of the base 110 can be a direction A in FIG. 1, the two opposite sides of the base 110 are in the other direction perpendicular to the direction A, and the two opposite sides of the base 110 can be the two sides of the base 110 opposite in a direction B in FIG. 4.

The first rotating portions 501 are in rotation fit with the third rotating portions 111, the second rotating portions 502 are in rotation fit with the fourth rotating portions 112, and the first swing arm 510 and the second swing arm 520 are limited to the base 110 in a direction perpendicular to the extension direction of the base 110 by means of the corresponding fitting first rotating portions 501 and third rotating portions 111 and the corresponding fitting second rotating portions 502 and fourth rotating portions 112. That is to say, after the first swing arm 510 and the second swing arm 520 are in rotation fit with the base 110, the first swing arm 510 and the second swing arm 520 can be connected into a whole by means of the base 110.

The second end of the first swing arm 510 is rotatably connected to the first housing seat 310. In some embodiments, the second end of the first swing arm 510 can be hinged to the first housing seat 310 by means of the third rotating shaft 353 so as to achieve a rotational connection.

The first end of the third swing arm 530 is rotatably connected to the base 110, so that the third swing arm 530 can rotate around the base 110 by means of the first end of the third swing arm. The second end of the third swing arm 530 is in sliding fit with the first housing seat 310, so that the second end of the third swing arm 530 is configured to slide relative to the first housing seat 310. The second end of the third swing arm 530 is configured to slide relative to and be in rotation fit with the first screen supporting plate 210, so that the second end of the third swing arm 530 swings to drive the first screen supporting plate 210 to rotate relative to the first housing seat 310 while the assembly connection between the third swing arm 530 and the first screen supporting plate 210 is achieved.

A rotating axis of the first end of the first swing arm 510 and a rotating axis of the first end of the third swing arm 530 are distributed at an interval, so that in a swinging process of the first swing arm 510 and the third swing arm 530, the second end of the first swing arm 510 and the second end of the third swing arm 530 can relatively rotate, thereby driving the first screen supporting plate 210 to rotate relative to the first housing seat 310. In some embodiments, the rotating axis of the first end of the first swing arm 510 is parallel to the rotating axis of the first end of the third swing arm 530, so that the stability of the first swing arm 510 and the third swing arm 530 during rotation can be improved well.

The second end of the second swing arm 520 is rotatably connected to the second housing seat 320. In some embodiments, the second end of the second swing arm 520 can be hinged to the second housing seat 320 by means of the fourth rotating shaft 354 so as to achieve a rotational connection.

The first end of the fourth swing arm 540 is rotatably connected to the base 110, so that the fourth swing arm 540 can rotate around the base 110 by means of the first end of the fourth swing arm. The second end of the fourth swing arm 540 is in sliding fit with the second housing seat 320, so that the second end of the fourth swing arm 540 is configured to slide relative to the second housing seat 320 during rotation. The second end of the fourth swing arm 540 is configured to slide relative to and be in rotation fit with the second screen supporting plate 220, so that the second end of the fourth swing arm 540 swings to drive the second screen supporting plate 220 to rotate relative to the second housing seat 320 while the assembly connection between the fourth swing arm 540 and the second screen supporting plate 220 is achieved.

The rotating axis of the first end of the second swing arm 520 and the rotating axis of the first end of the fourth swing arm 540 are distributed at an interval, so that in the swinging process of the second swing arm 520 and the fourth swing arm 540, the second end of the second swing arm 520 and the second end of the fourth swing arm 540 can relatively rotate, thereby driving the second screen supporting plate 220 to rotate relative to the second housing seat 320. In some embodiments, the rotating axis of the first end of the second swing arm 520 is parallel to the rotating axis of the first end of the fourth swing arm 540, so that the stability of the second swing arm 520 and the fourth swing arm 540 during rotation can be improved well.

The folding electronic device according to this embodiment of this application is folded inwards, that is, after the folding electronic device is folded, the flexible display is superimposed between the first folding portion and the second folding portion. In the folding process of the folding electronic device, the rotating axis of the first end of the first swing arm 510 and the rotating axis of the first end of the third swing arm 530 are distributed at an interval, and the rotating axis of the first end of the second swing arm 520 and the rotating axis of the first end of the fourth swing arm 540 are distributed at an interval. Therefore, when a user controls the first folding portion to rotate relative to the second folding portion, the first housing seat 310 and the second housing seat 320 oppositely rotate relative to the base 110, the second end of the first swing arm 510 and the second end of the third swing arm 530 relatively rotate, the second end of the second swing arm 520 relatively rotates relative to the second end of the fourth swing arm 540, finally, the second end of the third swing arm 530 drives the first screen supporting plate 210 to rotate relative to the first housing seat 310, and the second end of the fourth swing arm 540 drives the second screen supporting plate 220 to rotate relative to the second housing seat 320. In this case, an end of the first screen supporting plate 210 close to the base 110 and an end of the second screen supporting plate 220 close to the base 110 are far away from each other, and finally, an accommodation space gradually expanded in the direction close to the base 110 can be formed, so that an enough space is provided for the bending area of the flexible display in the folding state, and the bending area of the flexible display is prevented from being excessively squeezed and thus damaged.

In this process, the second end of the third swing arm 530 slides relative to the first housing seat 310, which can adapt to the rotation of the first housing seat 310 driven by the second end of the first swing arm 510 and prevent the rotation of the first housing seat 310 from being locked. Similarly, the second end of the fourth swing arm 540 slides relative to the second housing seat 320, which can adapt to the rotation of the second housing seat 320 driven by the second end of the second swing arm 520 and prevent the rotation of the second housing seat 320 from being locked.

Meanwhile, the first housing seat 310 is rotatably connected to the first swing arm 510, and the second housing seat 320 is rotatably connected to the second swing arm 520. Therefore, when the user controls the folding electronic device to fold, the first housing seat 310 can rotate relative to the first swing arm 510, and the second housing seat 320 can rotate relative to the second swing arm 520, so that the first housing connected to the first housing seat 310 and the second housing connected to the second housing seat 320 can further rotate to close and parallel positions, thereby preventing a tapered gap from being generated between the first folding portion and the second folding portion after the folding electronic device is folded, and thus preventing foreign matter from entering.

In addition, the first rotating portions 501 and the second rotating portions 502 are respectively arranged between the first swing arm 510 and the second swing arm 520, and the third rotating portions 111 and the fourth rotating portions 112 are correspondingly arranged on the two opposite sides of the base 110. The first rotating portions 501 cooperate with the third rotating portions 111, and the second rotating portions 502 cooperate with the fourth rotating portions 112, so that the first housing seat 310 and the second housing seat 320 are limited to the base 110 in the direction perpendicular to the extension direction of the base 110 while the first housing seat 310 and the second housing seat 320 are rotatably connected by means of the base 110, thereby reducing the connecting difficulty between the first housing seat 310 and the second housing seat 320.

In some embodiments, the first rotating portions 501 and the third rotating portions 111 as well as the second rotating portions 502 and the fourth rotating portions 112 can be all corresponding shaft hole type structural members. In some embodiments, the first rotating portions 501, the second rotating portions 502, the third rotating portions 111 and the fourth rotating portions 112 are all provided with corresponding curved fitting members. That is to say, the first rotating portions 501 and the third rotating portions 111 are provided with corresponding curved fitting surfaces, so that the first rotating portions are in rotation fit with the third rotating portions. Correspondingly, corresponding curved fitting surfaces are arranged between the second rotating portions 502 and the fourth rotating portions 112, so that the second rotating portions 502 are in rotation fit with the fourth rotating portions 112. In some embodiments, the curved fitting surfaces on the first rotating portions 501 and the second rotating portions 502 may have the same structure or different structures, which is not limited herein.

Meanwhile, in order to ensure that the first housing seat 310 and the base 110 which are rotatably connected are limited to each other in the direction perpendicular to the extension direction of the base 110 by means of the first rotating portions 501 and the third rotating portions 111 as well as the second rotating portions 502 and the fourth rotating portions 112, correspondingly, the curved fitting surfaces of the first rotating portions 501 and the curved fitting surfaces of the second rotating portions 502 are oppositely arranged, if the arc of the curved fitting surfaces of the first rotating portions 501 is arranged upwards, the arc of the curved fitting surfaces of the second rotating portions 502 can be arranged downwards, or one arc is arranged leftwards, and the other arc is arranged rightwards. In the case of the described technical solution, the third rotating portions 111 cooperate with the first rotating portions 501, and the fourth rotating portions 112 cooperate with the second rotating portions 502, so that the first housing seat 310 and the base 110 are limited to each other in the direction perpendicular to the extension direction of the base 110.

Correspondingly, in the case that the first rotating portions 501 and the second rotating portions 502 on the first swing arm 510 use the described technical solution, the first rotating portions 501 and the second rotating portions 502 on the second swing arm 520 can also be arranged according to the described technical solution. In some embodiments, the size and position relationship of the first rotating portions 501 and the second rotating portions 502 arranged on the second swing arm 520 can be correspondingly the same as or different from the size and position relationship of the first rotating portions 501 and the second rotating portions 502 arranged on the first swing arm 510, which is not limited herein.

Figure 3:
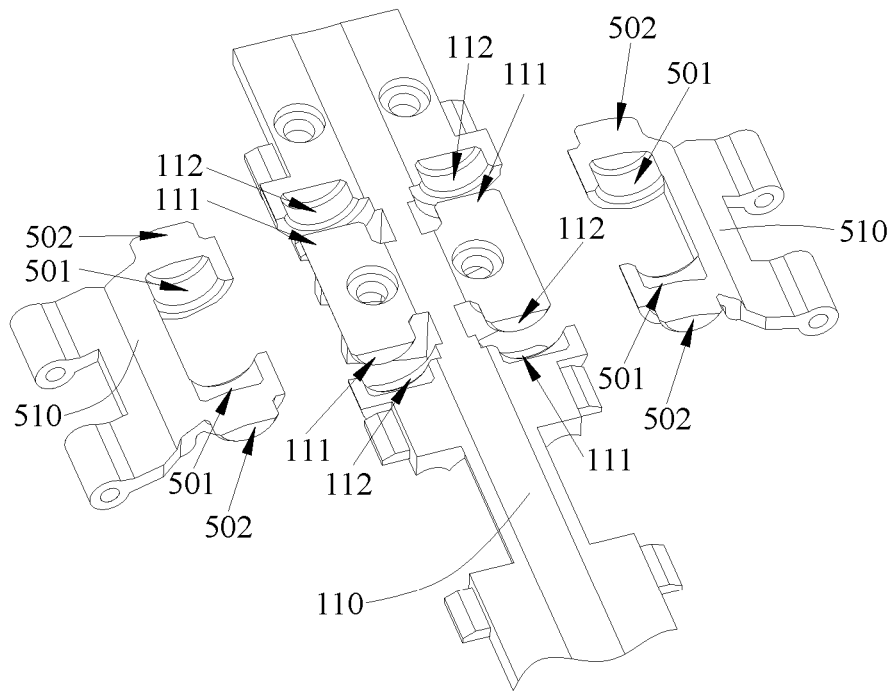
FIG. 3 is a schematic enlarged diagram of the folding mechanism including a base disclosed by an embodiment of this application.

In order to improve the stability of the cooperative relationship between the first housing seat 310 and the second housing seat 320 and the base 110, as shown in FIG. 3, at least one of the first swing arm 510 and the second swing arm 520 is provided with two first rotating portions 501, and at least one second rotating portion 502 is arranged between the two first rotating portions 501. The first rotating portions 501 and the second rotating portions 502 apply opposite limiting directions to the first swing arm 510. Therefore, by using the described technical solution, the first rotating portions 501 are respectively arranged on two opposite sides of the second rotating portions 502, so that the case of mutual tilting between the first swing arm 510 and the base 110 can be prevented, and the fitting stability between the first housing seat 310 and the base 110 is improved. In order to ensure that the fitting stability between all the components of the whole folding mechanism is relatively good, both the first swing arm 510 and the second swing arm 520 can use the described technical solution.

Furthermore, at least one of the first swing arm 510 and the second swing arm 520 is provided with a plurality of first rotating portions 501 and a plurality of second rotating portions 502, and the first rotating portions 501 and the second rotating portions 502 are alternately distributed. In the case of the described technical solution, the case of mutual tilting in the relative rotating process of the first swing arm 510 and the base 110 can be further prevented, so that the fitting stability between the first swing arm 510 and the base 110 is further improved. In some embodiments, both the first swing arm 510 and the second swing arm 520 can use the described technical solution, so that the cooperative relationship between the first swing arm 510 and the second swing arm 520 and the base 110 is stable, and thus the first screen supporting plate 210 and the second screen supporting plate 220 in the folding mechanism achieve reliable and good supporting effects on the flexible display.

In some embodiments, the first swing arm 510 and the second swing arm 520 are both respectively provided with two first rotating portions 501 and two second rotating portions 502, and the two first rotating portions 501 and the two second rotating portions 502 are alternately distributed. In addition, two third rotating portions 111 and fourth rotating portions 112 are respectively arranged on the two opposite sides of the base 110 corresponding to one first swing arm 510 and one second swing arm 520. In the case of the described technical solution, the first swing arm 510 and the second swing arm 520 are basically in stable rotation fit with the base 110, and the total number of structures on all the components is relatively small, so that the processing difficulty and production cost can be reduced to a certain extent.

As described above, the first rotating portions 501 and the second rotating portions 502 are both respectively provided with the curved fitting surfaces, by taking the first swing arm 510 as an example, in the first swing arm 510, the first rotating portions 501 are provided with matching grooves, the second rotating portions are provided with matching protrusions, and the matching grooves and the matching protrusions are both provided with curved fitting surfaces. In some embodiments, by using etching or drilling methods, the matching grooves and the matching protrusions provided with the curved fitting surfaces can be formed on the base 110, correspondingly, one of the third rotating portions 111 and the fourth rotating portions 112 on the base 110 can be provided with matching grooves, the other can be provided with matching protrusions, the matching grooves of the base 110 are in corresponding fit with the matching protrusions on the first swing arm 510, and the matching protrusions on the bas portion 110 are in corresponding fit with the matching grooves on the first swing arm 510, so that the first swing arm and the base are limited to each other in the direction perpendicular to the extension direction of the base 110 while the first swing arm 510 is in rotation fit with the base 110.

In the case of the described structure, in order to ensure that the first swing arm 510 can be in normal fit with the base 110, all the matching grooves need to have notches, so that the corresponding structures in the first swing arm 510 extend into the matching grooves from the notches of the matching grooves on the base 110; meanwhile, the corresponding structures on the base 110 can extend into the matching grooves through the notches of the matching grooves on the first swing arm 510, so that the purpose of rotatably connecting the first swing arm 510 to the base 110 is achieved.

In some embodiments, the matching protrusions can be arranged on the side towards which the notches of the matching grooves face. In another embodiment of this application, as shown in FIG. 3, the matching protrusions can be arranged away from the notches of the matching grooves. In this case, according to FIG. 3, the matching protrusions on the base 110 can be arranged in the direction towards which the matching grooves face, so that when the third rotating portions 111 and the fourth rotating portions 112 of the same size are formed, by using the described technical solution, the occupied space of the third rotating portions 111 and the fourth rotating portions 112 on the base 110 can be greatly reduced, and the difficulty and workload of forming the third rotating portions 111 and the fourth rotating portions 112 can be reduced to a certain extent.

In some embodiments, as shown in FIG. 3, the first swing arm 510 is opposite to the second swing arm 520, and the third swing arm 530 is opposite to the fourth swing arm 540. In some embodiments, the structures of the first swing arm 510 and the second swing arm 520 can be symmetrical with each other, and correspondingly, the third rotating portions 111 and the fourth rotating portions 112 which are arranged on the two opposite sides of the base 110 and respectively cooperate with the first swing arm 510 and the second swing arm 520 are correspondingly arranged. Similarly, the structures of the third swing arm 530 and the fourth swing arm 540 can be symmetrical with each other, and the structures on the base 110 which cooperate with the third swing arm and the fourth swing arm are also symmetrical with each other. By using the described technical solution, the symmetry of the folding mechanism can be greatly improved, thus the folding and unfolding performance of the folding structure is improved, the synchrony of the first screen supporting plate 210 and the second screen supporting plate 220 is good, and the supporting effect on the flexible display is improved.

As described above, the second end of the third swing arm 530 is configured to slide relative to the first housing seat 310. On this basis, in order to improve the matching effect, in some embodiments, the first housing seat 310 can be provided with a first sliding groove 311, and the second end of the third swing arm 530 is in sliding fit with the first sliding groove 311.

In a further technical solution, an inner wall of the first sliding groove 311 is provided with a first avoidance hole, a first track body 230 is fixed to the first screen supporting plate 210, the second end of the third swing arm 530 is provided with a first sliding member 551, the first track body 230 passes through the first avoidance hole and at least partially extends into the first sliding groove 311, and the first sliding member 551 is configured to slide relative to and be in rotation fit with the first track body 230. The structure is relatively simple, and can meet the assembly requirement that the second end of the third swing arm 530 is configured to slide relative to and be in rotation fit with the first screen supporting plate 210. In some embodiments, the first track body 230 is of a curve structure, and in the rotating process of the third swing arm 530, the first sliding member 551 can slide in the first track body 230. According to the structure, the structure of the first sliding groove 311 can be fully used, and a bottom wall of the first sliding groove 311 is provided with the first avoidance hole for assembly, so that the assembly structure is more compact.

Similarly, the second housing seat 320 is provided with a second sliding groove 321, and the second end of the fourth swing arm 540 is in sliding fit with the second sliding groove 321. By using the structure, the sliding fit stability can be improved.

In a further technical solution, an inner wall of the second sliding groove 321 is provided with a second avoidance hole, a second track body is fixed to the second screen supporting plate 220, the second end of the fourth swing arm 540 is provided with a second sliding member 552, the second track body passes through the second avoidance hole and at least partially extends into the second sliding groove 321, and the second sliding member 552 is configured to slide relative to and be in rotation fit with the second track body.

As described above, the first screen supporting plate 210 can be in rotation fit with the first housing seat 310 by means of structural components such as a shaft hole mechanism, the first screen supporting plate 210 is provided with a first shaft seat 250, the first housing seat 310 is provided with a second shaft seat 330, and the first shaft seat 250 and the second shaft seat 330 are connected by means of a first rotating shaft 351. The described rotational connecting mechanism has the advantages of a simple structure, convenience in assembly and relatively high reliability. In some embodiments, a number of the first shaft seat 250 and the second shaft seat 330 can be both one, and in this case, the position of the first rotating shaft 351 can be limited by means of a structural member such as a shaft pin; or, a number of at least one of the first shaft seat 250 and the second shaft seat 330 can be more, and in this case, the reliability of a rotational connection between the first housing seat 310 and the first screen supporting plate 210 can be improved. In some embodiments, a plurality of groups of first shaft seats 250 and second shaft seats 330 can be arranged, any group includes at least one first shaft seat 250 and at least one second shaft seat 330, and in this case, the reliability of a rotation fit between the first screen supporting plate 210 and the first housing seat 310 can be further improved.

Figure 2:
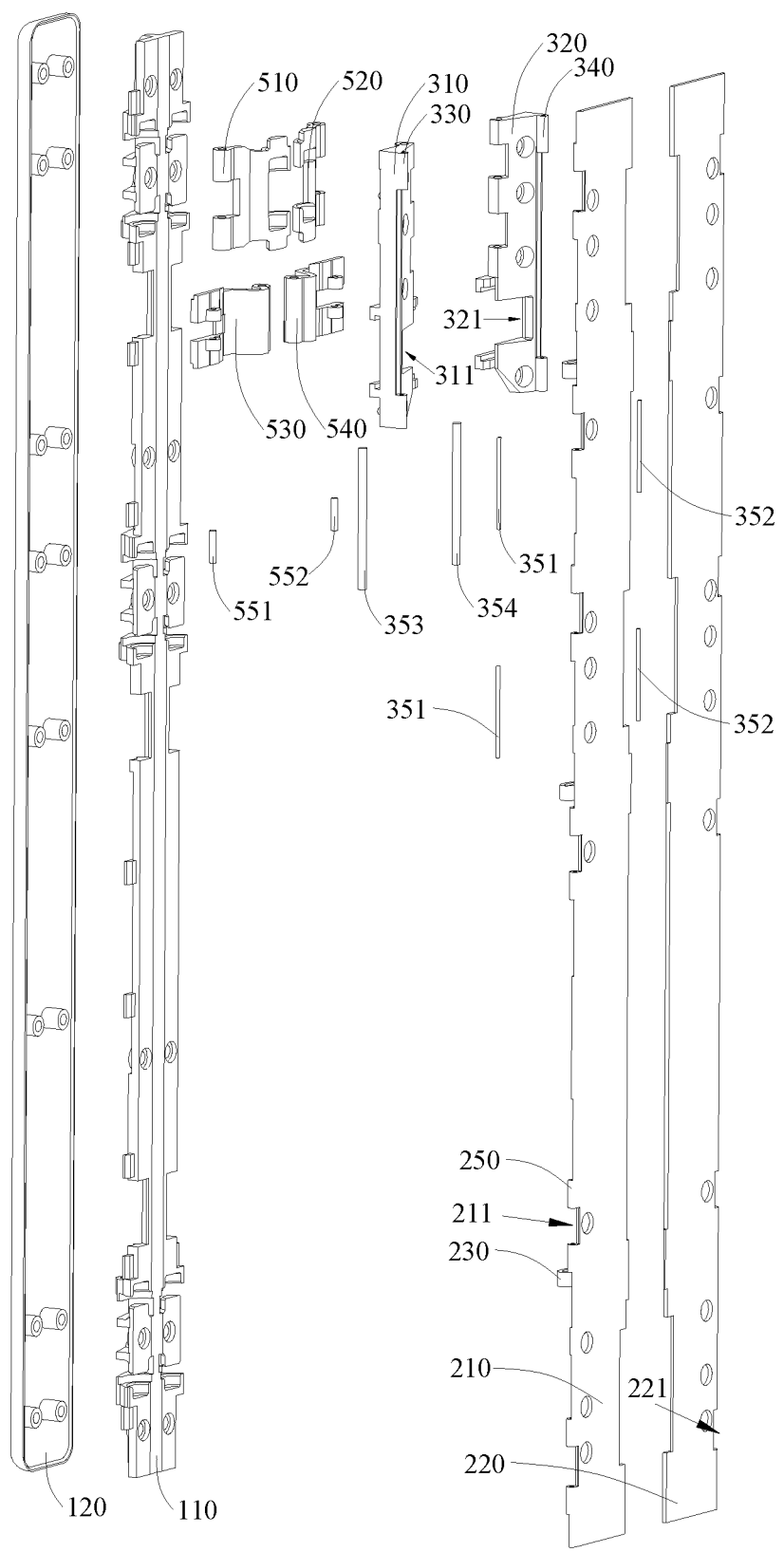
FIG. 2 is a schematic exploded diagram of the folding mechanism disclosed by an embodiment of this application.

Furthermore, as shown in FIG. 2, the first screen supporting plate 210 can be provided with a first avoidance gap 211, at least a part of the second shaft seat 330 is arranged in the first avoidance gap 211, and in this case, the occupied space of the first screen supporting plate 210 and the first housing seat 310 in the thickness direction of the first screen supporting plate 210 can be reduced, so that the thickness of the whole folding mechanism is reduced, and thus the thickness of the electronic device using the folding mechanism is also reduced relatively.

On the basis of the described embodiment, the second screen supporting plate 220 is provided with a third shaft seat, the second housing seat 320 is provided with a fourth shaft seat 340, and the third shaft seat and the fourth shaft seat 340 are connected by means of a second rotating shaft 352. The described rotational connecting mechanism has the advantages of a simple structure, convenience in assembly and relatively high reliability. In some embodiments, a number of the third shaft seat and the fourth shaft seat 340 can be both one, and in this case, the position of the second rotating shaft 352 can be limited by means of a structural member such as a shaft pin; or, a number of at least one of the third shaft seat and the fourth shaft seat 340 can be more, and in this case, the reliability of a rotational connection between the second housing seat 320 and the second screen supporting plate 220 can be improved. In some embodiments, a plurality of groups of third shaft seats and fourth shaft seats 340 can be arranged, any group includes at least one third shaft seat and at least one fourth shaft seat 340, and in this case, the reliability of a rotation fit between the second screen supporting plate 220 and the second housing seat 320 can be further improved.

Furthermore, as shown in FIG. 2, the second screen supporting plate 220 can be provided with a second avoidance gap 221, at least a part of the fourth shaft seat 340 is arranged in the second avoidance gap 221, and in this case, the occupied space of the second screen supporting plate 220 and the second housing seat 320 in the thickness direction of the second screen supporting plate 220 can be reduced, so that the thickness of the whole folding mechanism is reduced, and thus the thickness of the electronic device using the folding mechanism is also reduced relatively.

In the folding mechanism disclosed by this embodiment of this application, a number of the hinge mechanisms can be at least two, and the at least two hinge mechanisms are arranged at an interval. According to the structure, stable rotational connection assembly can be achieved by means of a plurality of hinge mechanisms.

Figure 6:
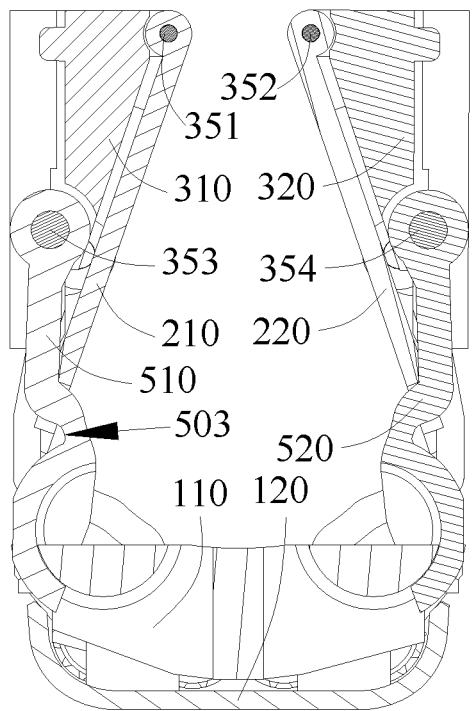
FIG. 6 is a schematic cross-sectional diagram of the folding mechanism in the folding state disclosed by an embodiment of this application.

In some embodiments, as shown in FIG. 3 and FIG. 6, the folding mechanism further includes a cover body 120, where the cover body 120 is fixedly connected to a side of the base 110 away from the first screen supporting plate 210, the cover body 120 achieves a protective effect on the base 110, and the cover body 120 can shield the folding mechanism, so that when the folding mechanism is applied to the electronic device, a number of exposed parts of the electronic device is reduced as far as possible, on one hand, the appearance performance of the electronic device is improved, on the other hand, the dustproof and waterproof performance of the electronic device is improved, and the reliability of the electronic device is improved. The cover body 120 can be fixed to the base 110 by using a bonding method. In the other embodiment of this application, the base 110 and the cover body 120 can be detachably and fixedly connected by means of threaded connectors such as screws, so that the reliability in connection between the base and the cover body is improved.

Meanwhile, in the folding state, a projection of the cover body 120 in a plane where the distribution direction of the first screen supporting plate 210 and the second screen supporting plate 220 and the extension direction of the base 110 are located covers the first housing seat 310, the second housing seat 320 and the base 110, so that the cover body 120 achieves a good shielding effect. It should be noted that: the distribution direction of the first screen supporting plate 210 and the second screen supporting plate 220 can be the direction B in FIG. 4.

In some embodiments, according to the specific structure and size of other components in the folding mechanism, the structure, size and mounting position of the cover body 120 are designed, so that when the folding mechanism is viewed from the front of the side where the cover body 120 is located in the folding state of the folding mechanism, the first housing seat 310, the second housing seat 320 and the base 110 in the folding mechanism can be shielded by the cover body 120.

Figure 4:
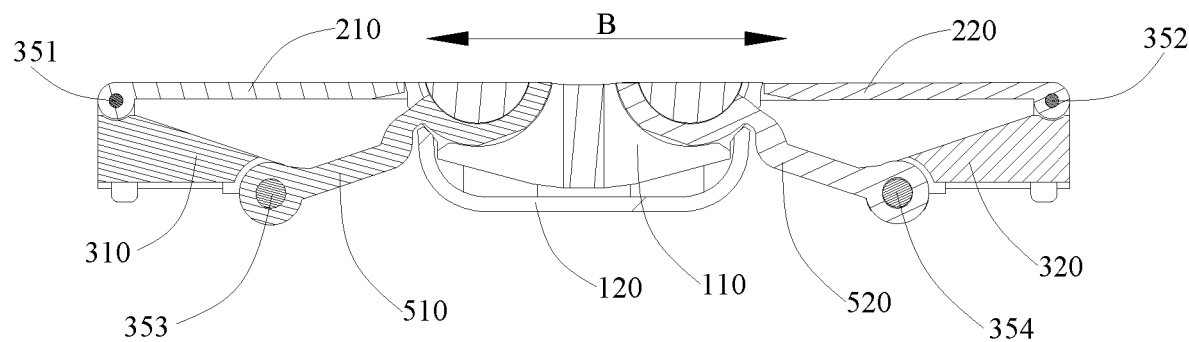
FIG. 4 is a schematic cross-sectional diagram of the folding mechanism in an unfolding state disclosed by an embodiment of this application.
Figure 5:
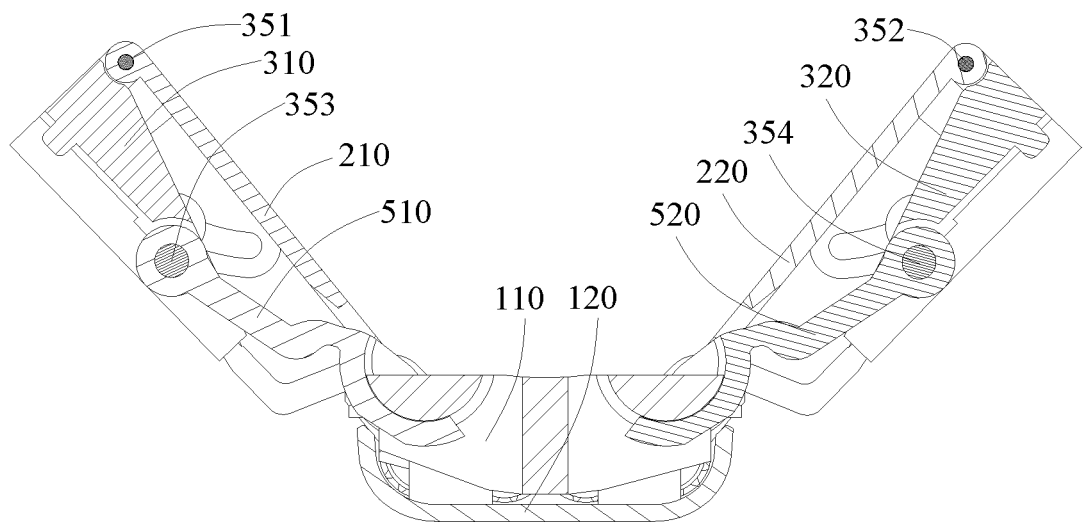
FIG. 5 is a schematic cross-sectional diagram of the folding mechanism in a certain state between the unfolding state and a folding state disclosed by an embodiment of this application.

Furthermore, as shown in FIG. 4 to FIG. 6, the first swing arm 510 and/or the second swing arm 520 includes an avoidance structure, and the avoidance structure is provided with an avoidance groove; and as shown in FIG. 4, a side of the cover body 120 is accommodated into the avoidance groove in the unfolding state. In some embodiments, the position and size of the avoidance groove can be flexibly determined according to the extension position and thickness of the cover body 120, which is not limited herein.

As described above, the folding mechanism disclosed by this embodiment of this application has the folding state and the unfolding state; and in the folding state, a distance between the first end of the first screen supporting plate 210 and the first end of the second screen supporting plate 220 is a first distance, a distance between the second end of the first screen supporting plate 210 and the second end of the second screen supporting plate 220 is a second distance, the first distance is greater than the second distance, the second distance is smaller and is close to zero. In some embodiments, the second distance can be zero. The first end of the first screen supporting plate 210 is an end of the first screen supporting plate 210 close to the base 110, the second end of the first screen supporting plate 210 is an other end of the second screen supporting plate 220 away from the base 110, the first end of the second screen supporting plate 220 is an end of the second screen supporting plate 220 close to the base 110, and the second end of the second screen supporting plate 220 is an other end of the screen supporting plate 220 away from the base 110.

In the unfolding state, a supporting surface of the first screen supporting plate 210 is coplanar with a supporting surface of the second screen supporting plate 220, the supporting surface of the first screen supporting plate 210 and the back surface of the first screen supporting plate 210 are oppositely arranged, and the supporting surface of the second screen supporting plate 220 and the back surface of the second screen supporting plate 220 are oppositely arranged. In this case, in the folding state of the folding mechanism, the first screen supporting plate 210 and the second screen supporting plate 220 form the accommodation space gradually expanded in the direction close to the base 110. In the unfolding state, a large supporting structure can be formed in a coplanar form, so that auxiliary supporting for the flexible display is achieved.

On the basis of the folding mechanism disclosed by an embodiment of this application, an embodiment of this application discloses an electronic device, where the electronic device includes the folding mechanism described in the foregoing embodiment.

The electronic device disclosed by this embodiment of this application further includes a first folding portion and a second folding portion, where the first folding portion includes a first housing, the second folding portion includes a second housing, the first housing is fixedly connected to the first housing seat 310, the second housing is fixedly connected to the second housing seat 320, the first screen supporting plate 210 is arranged between the first housing and the base 110, the second screen supporting plate 220 is arranged between the second housing and the base 110, and a flexible display is arranged on the base 110, the first housing, the second housing, the first screen supporting plate 210 and the second screen supporting plate 220.

In some solutions, the first housing can be provided with a first groove, the second housing can be provided with a second groove, the first screen supporting plate 210 is located in the first groove, and the second screen supporting plate 220 is located in the second groove. When the electronic device is in the folding state, the first housing is superimposed with the second housing. The first screen supporting plate 210 and the second screen supporting plate 220 are respectively located in the first groove and the second groove. Therefore, a gap between the first housing and the second housing can be reduced after the electronic device is folded, and the first housing and the second housing almost attach to each other.

The electronic device disclosed by this embodiment of this application can be a mobile phone, a computer, an ebook reader and a wearable device. This embodiment of this application does not limit the specific type of the electronic device.

It should be noted that: the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one . . . " does not exclude that there are still other same elements in the processes, methods, objects, or apparatuses. Furthermore, it should be pointed out that the scope of the methods and apparatuses in the embodiments of the present application is not limited to execute functions in the shown or discussed order, but may execute functions in a substantially simultaneous manner or in the reverse order according to the involved functions, for example, the described methods may be executed in a different order than described, and steps may be added, omitted, or combined. In addition, features described in some examples may also be combined in other examples.

The embodiments of the present application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A folding mechanism, comprising a base, a first housing seat, a second housing seat, a first screen supporting plate, and a second screen supporting plate, wherein:
the first housing seat is arranged on the first screen supporting plate, and the first screen supporting plate is in rotation fit with the first housing seat;
the second housing seat is arranged on the second screen supporting plate, and the second screen supporting plate is in rotation fit with the second housing seat;
the folding mechanism further comprises a hinge mechanism, wherein the hinge mechanism comprises a first swing arm, a second swing arm, a third swing arm, and a fourth swing arm, the first swing arm and the third swing arm are both arranged on a same side as the first housing seat, and the second swing arm and the fourth swing arm are both arranged on a same side as the second housing seat;
first rotating portions and second rotating portions, distributed in an extension direction of the base, are respectively arranged at first ends of the first swing arms and second swing arms, third rotating portions and fourth rotating portions are respectively arranged on two opposite sides of the base, the first rotating portions are in rotation fit with the third rotating portions, the second rotating portions are in rotation fit with the fourth rotating portions, and the first swing arm and the second swing arm are both limited to the base in a direction perpendicular to the extension direction of the base;
a second end of the first swing arm is rotatably connected to the first housing seat, a first end of the third swing arm is rotatably connected to the base, the first housing seat is provided with a first sliding groove, a second end of the third swing arm is in sliding fit with the first sliding groove, an inner wall of the first sliding groove is provided with a first avoidance hole, a first track body is fixed to the first screen supporting plate, the second end of the third swing arm is provided with a first sliding member, the first track body passes through the first avoidance hole and at least partially extends into the first sliding groove, the first sliding member is configured to slide relative to and be in rotation fit with the first track body, and a rotating axis of the first end of the first swing arm and a rotating axis of the first end of the third swing arm are distributed at an interval; and
a second end of the second swing arm is rotatably connected to the second housing seat, a first end of the fourth swing arm is rotatably connected to the base, the second housing seat is provided with a second sliding groove, a second end of the fourth swing arm is in sliding fit with the second sliding groove, an inner wall of the second sliding groove is provided with a second avoidance hole, as second track body is fixed to the second screen supporting plate, the second end of the fourth swing arm is provided with a second sliding member, the second track body passes through the second avoidance hole and at least partially extends into the second sliding groove, the second sliding ember is configured to slide relative to and be in rotation fit with the second track body, and a rotating axis of the first end of the second swing arm and a rotating axis of the first end of the fourth swing arm are distributed at an interval.

2. The folding mechanism according to claim 1, wherein the first rotating portions and the second rotating portions as well as the third rotating portions and the fourth rotating portions are respectively provided with corresponding curved fitting surfaces, and the curved fitting surfaces of the first rotating portions and the curved fitting surfaces of the second rotating portions are oppositely arranged.

3. The folding mechanism according to claim 2, wherein at least one of the first swing arm and the second swing arm is provided with two first rotating portions, and at least one of the second rotating portions is arranged between the two first rotating portions.

4. The folding mechanism according to claim 3, wherein at least one of the first swing arm and the second swing arm is provided with a plurality of the first rotating portions and a plurality of the second rotating portions, and the first rotating portions and the second rotating portions are alternately distributed.

5. The folding mechanism according to claim 2, wherein the first rotating portions are provided with matching grooves, the second rotating portions comprise matching protrusions, the matching grooves and the matching protrusions are both provided with the curved fitting surfaces, and in the extension direction of the base, the matching protrusions deviate from notches of the matching grooves.

6. The folding mechanism according to claim 1, wherein the first swing arm is opposite to the second swing arm, and the third swing arm is opposite to the fourth swing arm.

7. The folding mechanism according to claim 1, wherein the first screen supporting plate is provided with a first shaft seat, the first housing seat is provided with a second shaft seat, and the first shaft seat and the second shaft seat are connected by means of a first rotating shaft.

8. The folding mechanism according to claim 7, wherein the first screen supporting plate is provided with a first avoidance gap, and at least a part of the second shaft seat is arranged in the first avoidance gap.

9. The folding mechanism according to claim 7, wherein the second screen supporting plate is provided with a third shaft seat, the second housing seat is provided with a fourth shaft seat, and the third shaft seat and the fourth shaft seat are connected by means of a second rotating shaft.

10. The folding mechanism according to claim 9, wherein the second screen supporting plate is provided with a second avoidance gap, and at least a part of the fourth shaft seat is arranged in the second avoidance gap.

11. The folding mechanism according to claim 1, wherein a number of the hinge mechanisms is at least two, and the at least two hinge mechanisms are arranged at an interval.

12. The folding mechanism according to claim 1, wherein the folding mechanism further comprises a cover body, the cover body is fixedly connected to a side of the base away from the first screen supporting plate, and when the folding mechanism is in a folding state, a projection of the cover body in a plane where a rotating direction of the second rotating portions is located covers the first housing seat, the second housing seat, and the base.

13. The folding mechanism according to claim 12, wherein the first swing arm or the second swing arm comprises an avoidance structure, the avoidance structure is provided with an avoidance groove, and when the folding mechanism is in an unfolding state, a side of the cover body is accommodated into the avoidance groove.

14. The folding mechanism according to claim 1, wherein the folding mechanism has a folding state and an unfolding state, wherein:

in the folding state, a distance between a first end of the first screen supporting plate and a first end of the second screen supporting plate is a first distance, a distance between a second end of the first screen supporting plate and a second end of the second screen supporting plate is a second distance, and the first distance is greater than the second distance, wherein the first end of the first screen supporting plate is an end of the first screen supporting plate close to the base, the second end of the first screen supporting plate is an other end of the first screen supporting plate away from the base, the first end of the second screen supporting plate is an end of the second screen supporting plate close to the base, and the second end of the second screen supporting plate is an other end of the screen supporting plate away from the base; and in the unfolding state, a supporting surface of the first screen supporting plate is coplanar with a supporting surface of the second screen supporting plate.

15. An electronic device, comprising the folding mechanism according to claim 1, a flexible display, a first housing, and a second housing, wherein:

the first housing is fixedly connected to the first housing seat;

the second housing is fixedly connected to the second housing seat;

the first screen supporting plate is arranged between the first housing and the base;

the second screen supporting plate is arranged between the second housing and the base; and the flexible display is arranged on the base, the first housing, the second housing, the first screen supporting plate, and the second screen supporting plate.

16. The electronic device according to claim 15, wherein the first housing is provided with a first groove, the second housing is provided with a second groove, the first screen supporting plate is arranged in the first groove, and the second screen supporting plate is arranged in the second groove.

* * * * *